Dec. 27, 1960  O. GARAPOLO  2,966,186
HYDRAULIC MULTICONTACT SLICED BACON SLICE VARIATION CONTROL
Filed Nov. 18, 1957  6 Sheets-Sheet 1

Inventor,
Orlando Garapolo,
By: Schneider, Dressler & Goldsmith, Attys.

Dec. 27, 1960  O. GARAPOLO  2,966,186
HYDRAULIC MULTICONTACT SLICED BACON SLICE VARIATION CONTROL
Filed Nov. 18, 1957  6 Sheets-Sheet 2

Inventor,
Orlando Garapolo,
By: Schneider, Dressler & Goldsmith, Attys.

Dec. 27, 1960  O. GARAPOLO  2,966,186
HYDRAULIC MULTICONTACT SLICED BACON SLICE VARIATION CONTROL
Filed Nov. 18, 1957  6 Sheets-Sheet 3

Inventor,
Orlando Garapolo,
By Schneider, Dressler
& Goldsmith, Attys.

Dec. 27, 1960  O. GARAPOLO  2,966,186
HYDRAULIC MULTICONTACT SLICED BACON SLICE VARIATION CONTROL
Filed Nov. 18, 1957  6 Sheets-Sheet 4

Inventor,
Orlando Garapolo,
By: Schneider, Dressler, & Goldsmith, Attys.

Dec. 27, 1960  O. GARAPOLO  2,966,186
HYDRAULIC MULTICONTACT SLICED BACON SLICE VARIATION CONTROL
Filed Nov. 18, 1957  6 Sheets-Sheet 5
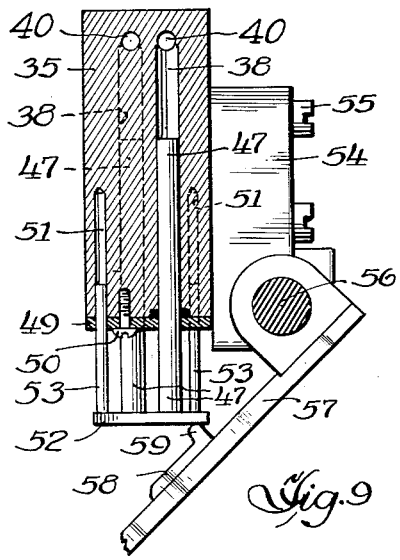
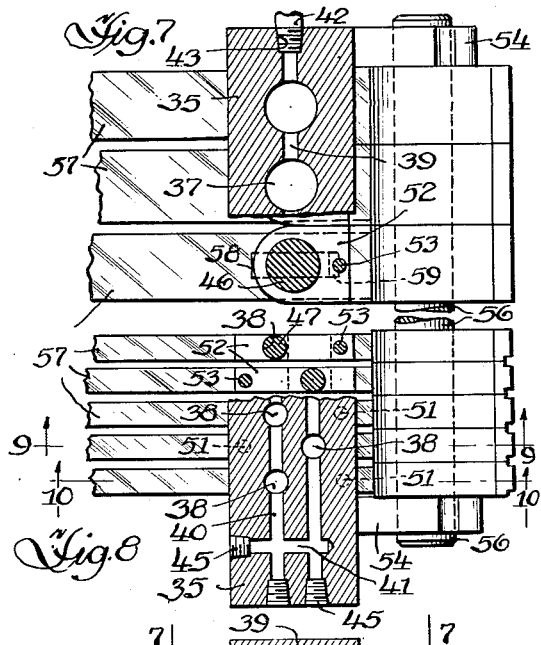
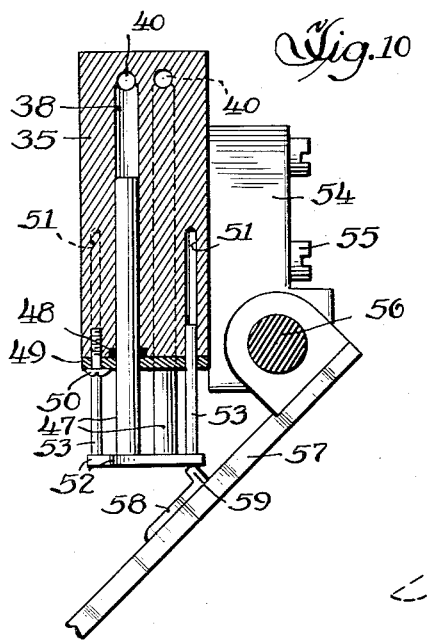
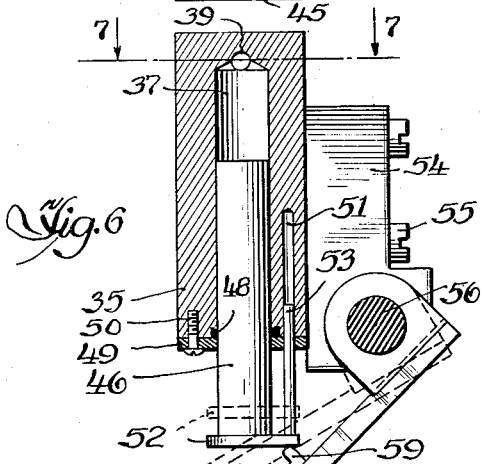
Inventor,
Orlando Garapolo,
By: Schneider, Dressler & Goldsmith, Attys.

Dec. 27, 1960     O. GARAPOLO     2,966,186
HYDRAULIC MULTICONTACT SLICED BACON SLICE VARIATION CONTROL
Filed Nov. 18, 1957     6 Sheets-Sheet 6
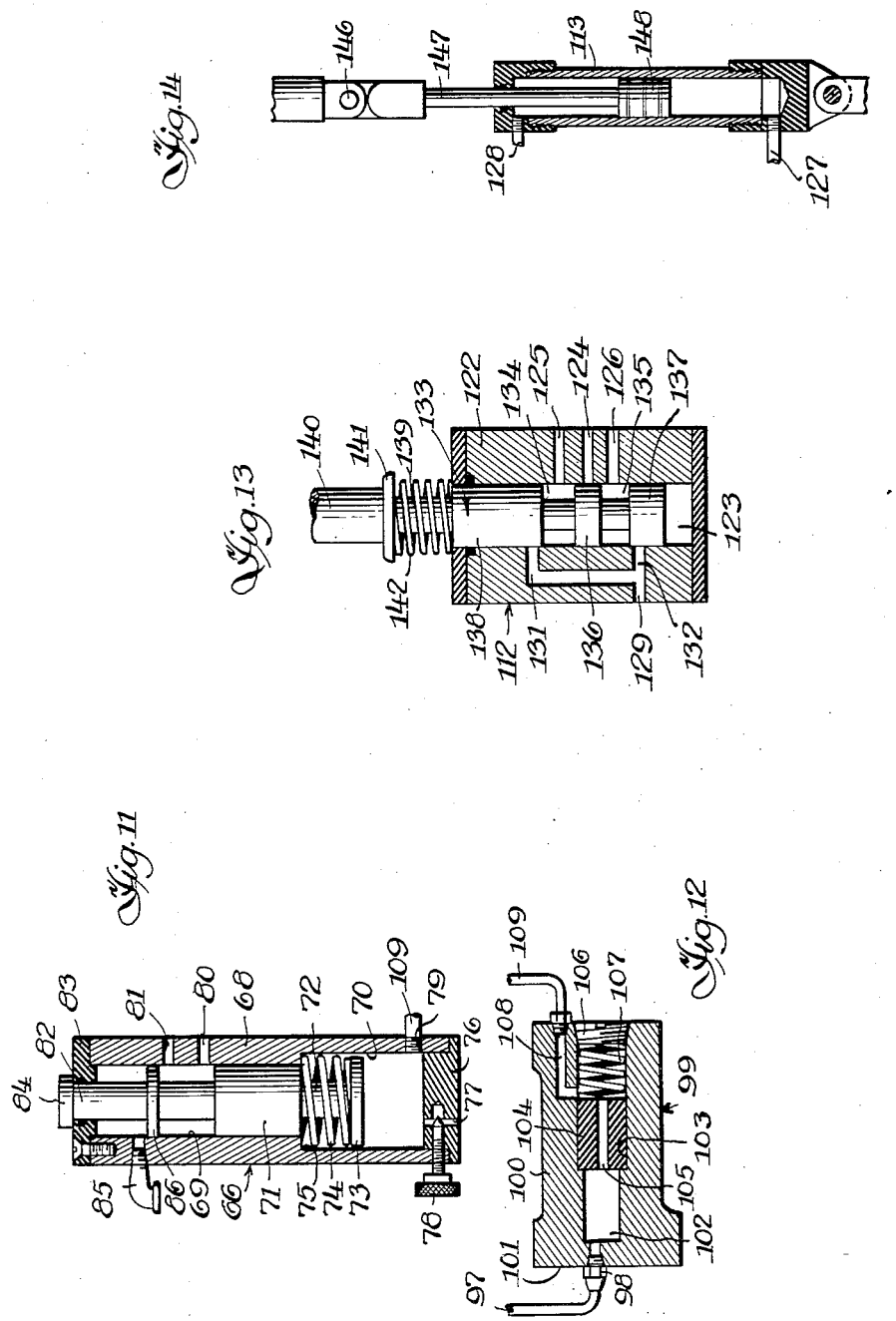
Inventor,
Orlando Garapolo,
By: Schneider, Dressler & Goldsmith, Attys.

United States Patent Office 2,966,186
Patented Dec. 27, 1960

2,966,186

HYDRAULIC MULTICONTACT SLICED BACON SLICE VARIATION CONTROL

Orlando Garapolo, Brookfield, Ill., assignor to Wilson & Co., Inc., a corporation of Delaware Filed Nov. 18, 1957, Ser. No. 696,976

28 Claims. (Cl. 146—95)

This invention relates to a hydraulic multicontact sliced bacon slice variation control, and is particularly concerned with means for instantly changing the feed rate in a bacon slicing machine having a slicing blade rotating at a constant speed to change the thickness of the bacon slices being cut, whenever the cross sectional area of the portion of a slab of bacon in engagement with the slicing blade varies, to produce individual bacon slices of uniform weight.

It is customary to sell sliced bacon in packages of uniform weight, such as one pound or one-half pound packages. One of the problems in packaging sliced bacon arises from the variation in weight between slices, even when the slices are cut from the same slab. Uniformity in the weight of individual slices of bacon is desirable because it speeds up the weighing operation and insures uniformity in the number of slices in each package of similar weight.

Bacon is graded according to the thickness and width of the slab. Generally slabs having a thickness of from one to two inches, and a width of from seven to eight and one-half inches are considered to be best. However, even with the variations noted above, which are permitted in top quality bacon, the number of slices per pound may vary from 15 to 28 if the slices are cut of uniform thickness. The slabs vary in thickness and width throughout the length of the slab.

In slicing bacon, the conventional procedure consists in placing a slab of bacon on a supporting table, engaging one end of it with a movable carriage, and feeding the slab of bacon toward the slicing blade by moving the carriage in the desired direction. The slicing blade is run at a fixed speed, and the thickness of the individual bacon slices depends upon the speed at which the carriage moves the bacon to the slicing blade. If the slices are of uniform thickness it is obvious that the slices from the thicker portions of the slab will weigh more than the slices from a thinner portion of the slab. In order to insure uniformity of weight for each slice of bacon, which is the only practical way of providing the same number of slices in each pound package of sliced bacon, the speed of the carriage must be regulated very accurately in conformity to the cross sectional area of the face of the slab being cut at the time it is being cut.

The present invention comprises means for automatically changing the speed of the carriage during the actual slicing operation. The carriage feeding the bacon to the slicing machine is moved by a hydraulic system which includes a cylinder and a piston having a piston rod connected to the carriage. The speed of the carriage is controlled by a flow control valve which regulates the flow of fluid into the cylinder. The structure herein disclosed includes means for automatically regulating the flow control valve to change the speed of the carriage instantly with each variation in the thickness or in the width of the slab of bacon being cut.

The control means of the present invention comprises a multiplicity of pivotally movable fingers normally engaging the top of the table on which the slabs of bacon are positioned. As each slab of bacon is fed toward the slicing blade it engages fingers positioned across the entire width of the slab, and moves the free end of each of such fingers pivotally upwardly a distance equal to the thickness of the slab at the particular point engaged by the free end of the specific finger concerned. The action of the control means is affected by the width of the slab of bacon as well as by its thickness at the particular point of contact with the free end of the fingers. The fingers positioned beyond the edge of the slab of bacon are not raised, and the total upward pivotal movement of the fingers depends upon the thickness of the portion of the slab as close to the slicing blade as it is possible for the fingers to be placed.

Each finger is connected to a small, individual piston, hereinafter referred to as finger pistons for convenience. The finger pistons constitute part of a second hydraulic system separate from the first hydraulic system which controls the feed of the slab of bacon to the slicing blade. Each finger piston displaces hydraulic fluid from its cylinder in an amount proportional to the vertical movement of the specific finger. A large cylinder communicates with each of the cylinders in which the finger pistons are mounted, and the hydraulic fluid displaced from the cylinders by the finger pistons moves a piston mounted in the large cylinder. An air cylinder aligned with the large cylinder exerts air pressure against the piston rod of the large cylinder to cushion its movement and to force it in the reverse direction when the cross sectional area of the slab of bacon being sliced is reduced. The reverse movement of the piston in the large cylinder keeps the fingers in contact with the top surface of the slab of bacon substantially throughout the slicing operation.

The resistance of the air cylinder is so great that it is impractical to allow a slab of bacon to lift all the fingers simultaneously against the pressure of the air cylinder. Accordingly, a single initiating finger is provided in advance of the group of fingers, and this initiating finger is engaged by the slab of bacon before the slab engages the group of fingers. The initiating finger is moved to trip a one-shot valve which acts through a timing valve to temporarily reduce the air pressure in the air cylinder, so that very little force is required to move the group of fingers. The air pressure is restored automatically just before the slicing operation starts, so that positive control of the feeding mechanism is maintained throughout the bacon slicing operation.

The piston in the large cylinder has a piston rod which is connected to one end of a floating lever. The other end of the floating lever is pivoted to the piston rod of a hydraulic cylinder which forms part of a third hydraulic system separate from the other two hydraulic systems. This last mentioned piston rod carries a clamp secured to the flow control valve of the first mentioned hydraulic system. The clamp rotates the flow control valve in either direction in accordance with the movement of the last mentioned piston rod.

The third hydraulic system includes a servo valve connected to the floating lever and a hydraulic pump connected to the last mentioned hydraulic cylinder through the servo valve. Rotation of the flow control valve regulates the speed at which the carriage moves toward the slicing blade by controlling the flow of fluid in the first mentioned hydraulic system. If the movement of the floating lever is caused by an increase in the fluid displaced by the finger pistons, due to an increase in the cross sectional area of the slab of bacon, the action of the third hydraulic system will be to turn the flow control valve to slow down the feed of the carriage, and thereby reduce the thickness of the slices of bacon being cut.

If the movement of the floating lever is in the opposite direction, as in the case of a reduction in the fluid displaced by the finger pistons, due to a decrease in the thickness or width of the slab of bacon, the flow control valve will be turned in the opposite direction to speed up the feed of the carriage and thereby increase the thickness of the slices being cut. In each case the adjustment of the rate of feed of the carriage is substantially instantaneous with each variation in the thickness or width of the slab of bacon. The fingers are spaced very close to the slicing blade, and the time lag between vertical movement of any of the fingers and the rotation of the flow control valve is kept to a minimum.

When the servo valve is in equilibrium the fluid, which is circulated constantly by the hydraulic pump, cannot enter the servo valve, and passes through a pressure relief valve to the reservoir. When the floating lever is moved pivotally in either direction it moves the spool of the servo valve axially, and aligns the inlet and one outlet of the servo valve with the fluid conduit from the pump. The fluid then passes through the servo valve into the top or bottom end of the last mentioned hydraulic cylinder, depending on which outlet is aligned with the conduit from the pump. The other outlet of the servo valve is simultaneously aligned with the conduit to the other end of the last mentioned hydraulic cylinder and with a conduit leading to the reservoir, so that the fluid displaced from said cylinder passes through the servo valve and back to the reservoir.

If the floating lever is lifted upwardly by the movement of the piston rod of the large cylinder, the spool of the servo valve is moved upwardly, and the fluid from the pump flows into the upper end of the hydraulic cylinder of the third hydraulic system to move its piston downwardly. The downward movement of this piston forces the fluid from the lower end of said cylinder through the servo valve and back to the reservoir. As long as the piston of the large cylinder continues its upward movement the other piston will continue its downward movement, and the floating lever will move about the servo valve connection as a pivot.

As soon as the piston of the large cylinder stops moving upwardly, the end of the floating lever secured to the piston rod of the large cylinder becomes the pivot, and the downward movement of the opposite end of the floating lever will move the servo valve in the opposite direction to its position of equilibrium, thus stopping the flow of fluid in the cylinder of the third hydraulic system and stopping the movement of its piston rod. When the piston rod of the third hydraulic system is stationary the flow control valve cannot move, and the feeding rate of the carriage will remain constant until another variation in the cross sectional area of the slab of bacon causes the finger pistons to move again. The direction in which the flow control valve is moved depends upon the direction of movement of the piston of the large cylinder, and the extent of the movement of the flow control valve is proportional to the extent of the movement of the piston of the large cylinder.

The structure by means of which the above and other advantages are attained will be described in detail in the following specification, taken in conjunction with the accompanying drawings, showing a preferred illustrative embodiment of the invention, in which:

Fig. 6 is an enlarged sectional view, taken along the line 6—6 of Fig. 5;

Fig. 7 is a fragmentary sectional view, taken generally along the line 7—7 of Fig. 6, but showing one of the pistons in section;

Fig. 8 is a fragmentary sectional view, taken generally along the line 8—8 of Fig. 5;

Fig. 9 is a fragmentary sectional view, taken along the line 9—9 of Fig. 8;

Fig. 10 is a fragmentary sectional view, taken along the line 10—10 of Fig. 8;

Fig. 11 is a sectional view of the timing valve;

Fig. 12 is a sectional view of the one-shot valve operated by the initiating finger;

Fig. 13 is a sectional view of the servo valve; and

Fig. 14 is a sectional view of the cylinder and piston assembly of the third hydraulic system.

Figure 1:
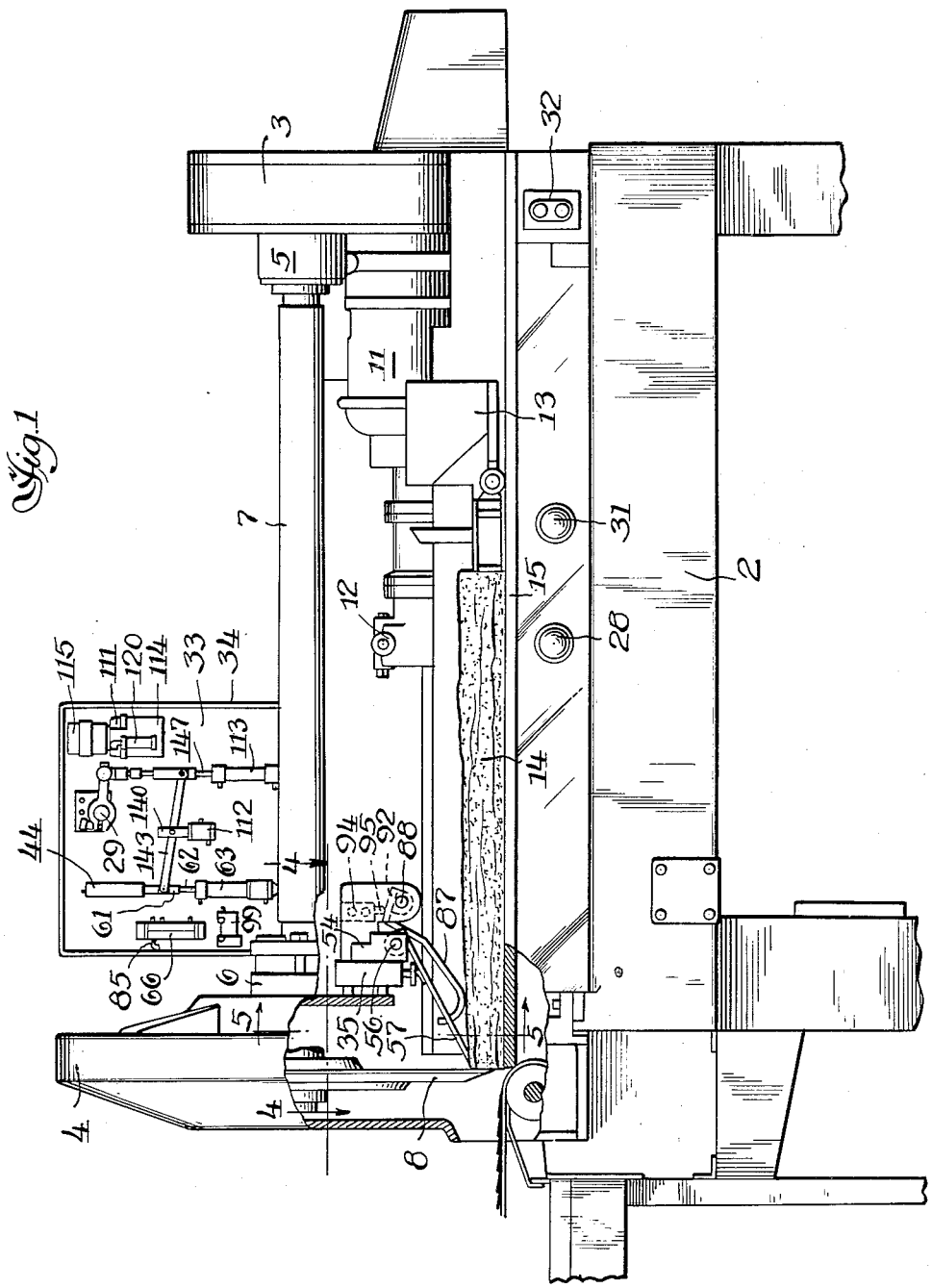
Figure 1 is a side elevational view of a bacon slicing machine embodying the invention, looking at the machine from the operator's side, and showing the housing for the flow control valve and the controls for two separate closed hydraulic systems which cooperate to adjust the flow control valve and thereby regulate the rate of feed of the slab of bacon to the slicing blades.
Figure 2:
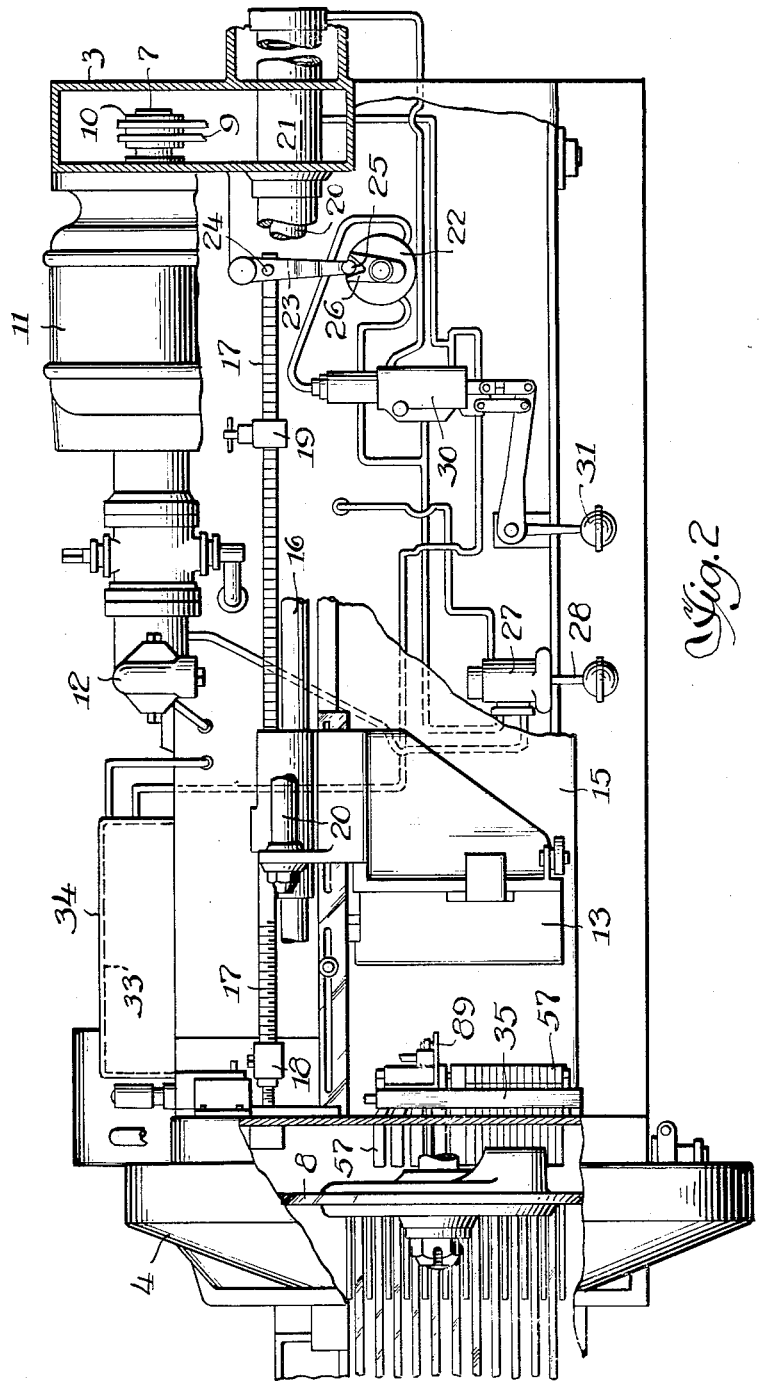
Fig. 2 is an enlarged top plan view of the machine shown in Fig. 1, with parts broken away to clarify the illustration, and showing the hydraulic system that moves the carriage for pushing the slab of bacon into engagement with the slicing blade.

In the drawings, the bacon slicing machine comprises a base 2 upon which upstanding end members 3 and 4 are mounted. End members 3 and 4 are provided respectively with bearings 5 and 6 in which opposite ends of a rotatable shaft 7 are mounted. A slicing blade 8 is mounted on one end of shaft 7 and is housed in the end member 4. The other end of shaft 7 carries a pulley 10 which is rotated by a motor 11. The motor 11 also operates a pump 12 which forces fluid through the first hydraulic system to control the reciprocatory movement of a carriage 13.

The slab of bacon 14 to be sliced is positioned on a receiving table 15. The carriage 13 is mounted on a guide rod 16 and a control rod 17. Two adjustable stop members 18 and 19 are mounted on the rod 17 to limit the longitudinal movement of the carriage which pushes the slab of bacon in front of it. The carriage 13 is connected to a piston rod 20 by means of which it is reciprocated. The control rod 17 has a limited longitudinal movement for a purpose hereinafter set forth.

The piston rod 20 is connected to a piston (not shown) mounted in a cylinder 21. The direction of movement of the piston rod 20 is controlled by a rotary pivot valve 22. A bell crank or lever 23 is pivoted to the control rod 17, as indicated at 24, and is oscillated by longitudinal movement of the rod 17 in opposite directions. The bell crank 23 has one end 25 positioned to engage a projection, such as arms 26, secured to valve 22 so as to reverse the valve every time the bell crank 23 is moved about its pivot 24. Engagement of the carriage 13 with either stop member 18 or 19 causes a longitudinal movement of the control rod 17 which in turn, causes pivotal movement of the lever 23, and thus operates the valve 22 to reverse the movement of the carriage.

The hydraulic system for moving the carriage 13 is conventional, and will not be described in detail. It includes a two way valve 27 controlled by a lever 28 to start and stop the flow of hydraulic fluid through the system, a flow control valve 29 which is adjusted to control the rate of flow, and a four way valve 30 controlled by a lever 31, to increase the speed of the rearward movement of the carriage. The operation of the machine is controlled by a start-stop switch 32 mounted on the operator's side of the machine.

The present invention is primarily concerned with means to automatically operate the flow control valve 29 which regulates the forward speed of the carriage 13, in response to variations in thickness or width of the slabs of bacon being fed to the slicing blade 8 by the carriage 13. Whenever the thickness of the slab decreases, the flow control valve 29 is opened wider to speed up the feed of carriage 13, and thereby increase the thickness of the individual slices of bacon being cut at that particular instant. Whenever the slab of bacon being sliced becomes thicker or wider, the valve 29 is moved towards closed position to slow down the feed of carriage 13, and thereby decrease the thickness of the individual slices of bacon. The mechanism for operating the flow control valve is mounted on a panel 33 which forms the back wall of a housing 34. The housing 34 may be provided with any suitable door structure.

Figure 3:
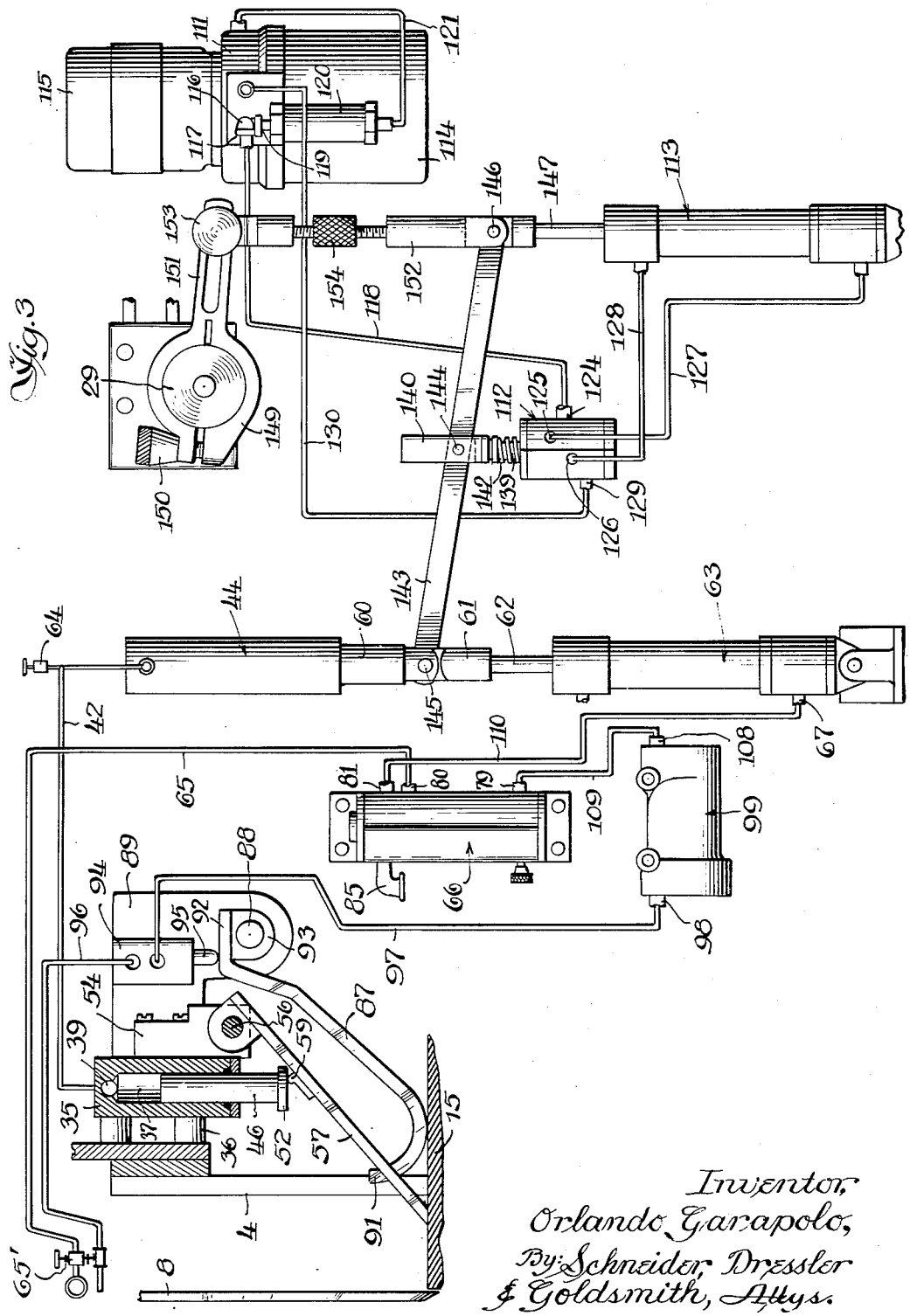
Fig. 3 is a general view of the control mechanism, partly in section and partly in elevation, showing the initiating finger, one cylinder assembly and the hydraulic systems for adjusting the flow control valve.

A cylinder block 35 is bolted to the end member 4, as indicated at 36 in Fig. 3. The cylinder block is provided with a plurality of vertical bores or cylinders 37 and 38 spaced transversely of the slicing machine. For reasons hereinafter explained, the cylinders 37 are larger than the cylinders 38. In order to provide close transverse spacing for the cylinders 38 they are offset alternately in a double row, as shown in Fig. 8. The cylinders 37 are connected at their upper ends by a transverse bore 39 which communicates with two transverse bores 40 connecting the upper ends of the cylinders 38. The transverse bores 40 are also connected by a cross bore 41 adjacent one end of the cylinder block.

A conduit 42 has one end secured in the outer end 43 of the bore 39. The other end of the conduit 42 is secured to one end of a large cylinder 44 to provide free communication between the cylinders 37, 38 and 44. Plugs 45 are inserted in the outer ends of bores 40 and 41 so that the conduit 42 is the only exit for hydraulic fluid displaced from the cylinders 37 and 38.

Each of the cylinders 37 and 38 is open at its bottom and has a finger piston 46 or 47 slidably mounted therein. An annular gasket 48 fits in a recess in the lower edge of the cylinder block to provide a leakproof seal for each finger piston 46 and 47. A wear plate 49 secured to the bottom of the cylinder block 35 by screws 50 is apertured to register with the open ends of each of the cylinders 37 and 38. Each aperture is of the same size as the open end of the cylinder in registration therewith. The wear plate 49 and the cylinder block 35 are also provided with a plurality of narrow vertical bores 51 for a purpose hereinafter disclosed. A bore 51 is provided adjacent each cylinder 37 or 38. The bores 51 adjacent the cylinders 37 are aligned transversely of the cylinder block 35 on one side of the cylinders. The bores 51 adjacent the cylinders 38 are alternately aligned in two transverse rows on opposite sides of the cylinders.

A plate 52 is secured to the bottom of each finger piston 46 and 47. The plates 52 are of uniform size and are aligned transversely. Accordingly, the pistons 47, which are offset in two transverse rows are not mounted in the same relative position on each of the plates 52. A guide pin 53 is secured to each plate 52 in vertical alignment with each vertical bore 51 to prevent any of the finger pistons from binding as they are moved vertically in the cylinders.

A pair of brackets 54, secured to the cylinder block 35 by a plurality of bolts 55, carry a rod 56 extending transversely of the machine. A plurality of fingers 57, pivotally mounted on the rod 56, extend downwardly under the cylinder block 35 toward the receiving table 15 with the free end of each finger close enough to the upper surface of the receiving table to be engaged by a slab of bacon moved along the table 15 by the carriage 13. As a slab of bacon is moved toward the slicing blade it engages each of the fingers positioned in its path of travel and lifts each finger about the pivot 56 a distance proportional to the thickness of the slab. Means, hereinafter described, are also provided to move the fingers downwardly when the thickness of the slab of bacon decreases, so that the free ends of the fingers remain in contact with the upper surface of the slab of bacon until the bacon passes the free ends of the fingers.

Each finger 57 has a striking bar 58 secured to its upper surface. The striking bars are spaced uniformly from the rod 56 to cause each of them to engage the bottom of the adjacent plate 52 near one edge of the plate. Since each striking bar is positioned the same distance from the pivot of its finger, and the plates 52 are aligned transversely of the machine, equal upward pivotal movement of each finger will lift the adjacent piston the same vertical distance. When the fingers move downwardly, in response to a decrease in thickness of the slab of bacon engaging them, each piston is moved downwardly, by means hereinafter described. It is preferred to provide each striking bar with an upwardly projecting flange 59, but the striking bar may be of any suitable shape. A projection integral with the upper surface of the fingers may serve as the striking bar, if desired.

Figure 4:
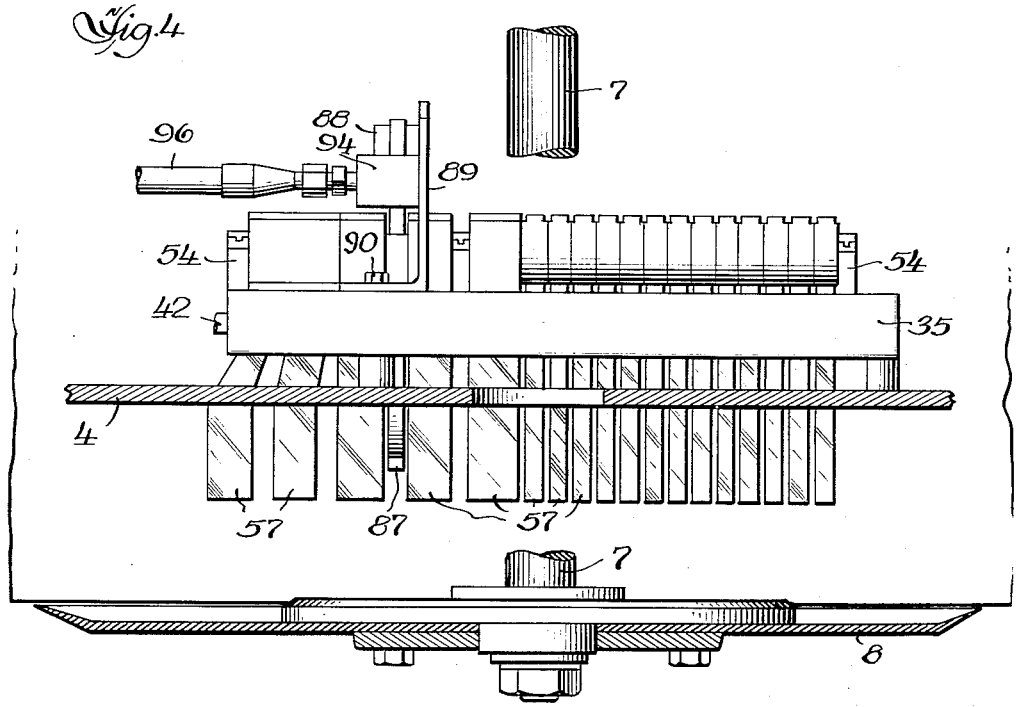
Fig. 4 is an enlarged fragmentary sectional view, taken generally along the line 4—4 of Fig. 1.
Figure 5:
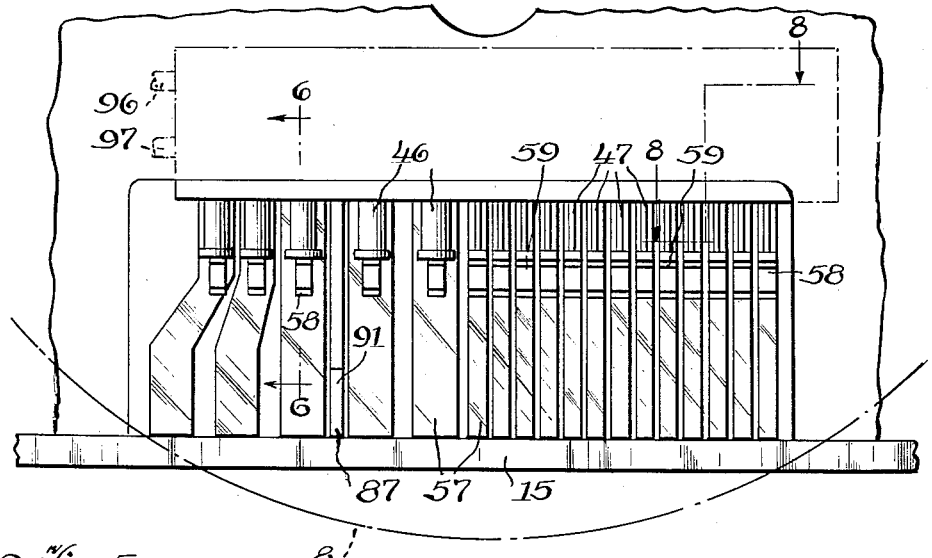
Fig. 5 is an enlarged fragmentary front elevational view, taken generally along the line 5—5 of Fig. 1.

Each slab of bacon, even of minimum width, will engage a certain number of the fingers 57 positioned closest to one side of the machine. As shown in Fig. 4, the fingers adapted to be engaged by a slab of bacon of minimum width are larger than the rest of the fingers which are engaged only by slabs of bacon of greater width. These smaller fingers are spaced very close to each other to increase the sensitivity of the feed regulating means to variations in the width of the slabs of bacon being fed to the slicing blade. Any appreciable variation in the width of the slab of bacon being sliced will affect the pivotal movement of one or more of the smaller fingers, and will effect a change in the rate of speed at which the carriage 13 is moved toward the slicing blade.

As shown in Fig. 3, the free ends of the fingers are spaced closely to the slicing blade 8 to increase the sensitivity of the feed adjusting means. The changes in the speed of the carriage for feeding the slabs of bacon to the slicing blade, which are responsive to variations in the thickness or width of the bacon, regulate the rate of feed of the bacon accurately in accordance with the cross sectional area of the slab of bacon in the plane in which the slab is being sliced. The slight distance between the free ends of the fingers and the slicing blade is commensurate with the amount of travel of the slab of bacon between the time the fingers 57 are pivotally moved by the slab of bacon and the very short interval of time it takes for the pivotal movement of the fingers to be reflected in the change in the rate of feed caused by said movement.

As a slab of bacon is being fed toward the slicing blade it engages a number of the fingers 57, depending upon its width, and lifts each of them a distance commensurate with its thickness at the point where it engages the free end of the particular finger. The upward movement of each finger lifts one of the finger pistons 46 or 47 and causes it to displace some of the fluid from the upper end of the cylinder in which the finger piston is mounted. The displaced fluid passes into one of the transverse bores 39, 40 or 41, and then through the conduit 42 into the upper end of the large cylinder 44.

A piston 60 slidably mounted in the large cylinder 44 is moved downwardly by the fluid flowing into the upper end of the cylinder 44. The movement of the piston 60 is dependent upon the total cumulative displacement of fluid from all of the cylinders 37 and 38. Thus, if the displacement of fluid from some of the cylinders 37 and 38 increases, due to an increase in thickness of the portions of the slab of bacon engaged by the fingers associated with the pistons of those cylinders, and the displacement of fluid in other cylinders 37 and 38 decreases an equal amount, due to a decrease in the thickness of the slab in areas engaged by other fingers, the total displacement will be the same, and the piston 60 will remain stationary.

A piston rod 61 depending from the piston 60 has a portion 62 of reduced diameter which fits into the upper end of an air cylinder 63. The air cylinder 63 is mounted on the panel 33 and serves to cushion the downward movement of the piston 60 as well as to force the piston 60 upwardly, and thus move the finger pistons 46 and 47 downwardly, when the thickness of the slab decreases. The fingers 57 might fall down by gravity when the thickness of the slab of bacon decreases, but the downward movement of the finger pistons 46 and 47 provides positive downward movement of the fingers and insures proper contact of the lower ends of the fingers 57 with the top surface of the slab of bacon at all times until the slab of bacon is moved past the free ends of the fingers.

The cylinders 37, 38 and 44, the transverse bores 39, 40 and 41 and the conduit 42 together comprise a second closed hydraulic system separate from and independent of the first mentioned hydraulic system that reciprocates the carriage 13. The conduit 42 is provided with a valve 64 (Fig. 3) to permit bleeding of the second hydraulic system.

As shown diagrammatically in Fig. 3, air under pressure flows from a conduit 65 through a timing valve 66 and into the inlet port 67 in the lower end of the cylinder 63. The timing valve 66, which is effective to maintain the predetermined pressure in the lower end of the cylinder 63 is shown in detail in Fig. 11. As shown in Fig. 11, the timing valve 66 comprises a tubular cylinder 68 having a bore 69 in the upper portion and a counterbore 70 of larger diameter in the lower portion. A piston 71, slidably fitted in the bore 69, has a depending stem 72 provided with a disk 73 of larger diameter than the bore 69 fitting in the counterbore 70. The stem 72 and the disk 73 are preferably integral with the piston 71. A compression spring 74, encircling the stem 72, is biased between the disk 73 and the annular shoulder 75 at the upper end of the counterbore 70 to urge the piston 71 to its lowermost position.

The bottom of the cylinder 68 is closed by a closure member 76 provided with a small orifice 77 extending therethrough. A set screw 78 extending through the peripheral edge of the closure member 76 may be positioned to close the orifice 77, or to leave it partially open to allow air to bleed from the lower end of the cylinder. The cylinder 68 is also provided with an air inlet 79 below the disk 73. The purpose of the orifice 77, screw 78 and air inlet 79 will be hereinafter described.

The upper end of the cylinder 68 is provided with an air inlet 80, to which the conduit 65 is connected, and an air outlet 81 connected to the air inlet 67 of the cylinder 63 by a conduit 110. An integral stem 82, extending upwardly from the piston 71, projects through a closure member 83 secured to the upper end of the cylinder 68, and is provided with an enlarged head 84 to limit the downward movement of the piston. The head 84 is preferably welded to the upper end of the stem 82 after the piston 71 has been positioned in the cylinder 68 with the stem 82 projecting through the closure member 83. The upper end of cylinder 68 has an exhaust outlet 85 open to the atmosphere. A sealing disk 86 projecting laterally from the rod 82 is normally positioned between the exhaust outlet 85 and the outlet 81. The disk 86, which is of the same diameter as the piston 71 and is preferably integral therewith, prevents the air in the cylinder 68 from passing through the exhaust outlet 85 when the piston 71 is in its normal, lowermost position.

If the pressure in the cylinder 63 becomes excessive, as, for instance, when the piston rod 61 is forced downwardly, the air from the lower end of the cylinder 63 will flow out of the opening 67 and into the opening 81 of the cylinder 68. The air then flows out of opening 80 and through the conduit 65 to a pressure regulating valve 65' having a pressure relief opening to the atmosphere.

When the downward movement of the piston rod 61 stops, the air pressure in the lower end of the cylinder 63 is no greater than the regulated pressure as controlled by the pressure regulating valve 65', and the flow of air through the opening 67 and into the opening 81 ceases. When the piston rod 61 moves upwardly in response to a decrease in the thickness of the slab of bacon, the air from the conduit 65 flows into the valve 66 through the inlet 80 and out through the outlet 81 into the lower end of the cylinder 63.

When the slab of bacon is first moved under the fingers 57, the simultaneous upward pivotal movement of the fingers would cause a total fluid displacement from the cylinders 37 and 38 so great that the resistance of the air pressure in the cylinder 63 would prevent instantaneous movement of the piston rod 61 to accurately reflect the thickness of the slab of bacon. The result would be that the fingers would not move upwardly fast enough to ride on the top surface of the slab of bacon. The fingers would gouge the upper portion of the bacon, and the slices would be thicker than they should be because the speed of the carriage 13 would not be slowed down to the proper rate. In order to eliminate these undesirable results, the air pressure in the cylinder 63 is substantially reduced for a very short interval just before the slab of bacon engages the fingers 57. This is accomplished by an initiating finger 87.

The initiating finger 87 is pivotally mounted on a stud 88 projecting laterally from a bracket 89, as shown in Fig. 3. The bracket 89 is secured to the rear side of the cylinder block 35 by a plurality of bolts, as indicated at 90 in Fig. 4. The free end of the finger 87 is curved upwardly, as indicated at 91 in Fig. 3, to project upwardly of the fingers 57 between which it is positioned, so that it may move upwardly without interference from either adjacent finger. The lowermost portion of the finger 87 rests on the top surface of the table 15 rearwardly of the area upon which the free ends of the fingers 57 rest. Accordingly the finger 87 is moved pivotally upwardly by the slab of bacon before it engages the fingers 57.

The uppermost end of finger 87 extends horizontally above the stud 88, as indicated at 92, and has a depending lug 93 apertured to fit on the stud 88. A valve 94 mounted above the upper end of the finger 87 has a depending stem 95 resting on the upper surface of the horizontal section 92 of the finger 87 forwardly of the stud 88 which is the pivot around which the finger 87 is moved. As the free end of the finger 87 is lifted by the slab of bacon being fed to the slicing blade, the stem 95 is pushed upwardly. A conduit 96, carrying air under pressure, leads to the valve 94.

The upward movement of the stem 95 opens the valve 94 and permits the air from the conduit 96 to flow through a conduit 97 leading to an air inlet 98 in a one-shot valve 99 mounted on the panel 33 adjacent the timing valve 66. The valve 94 remains open as long as the finger 87 remains in its lifted position, thus providing a continuous flow of air under pressure into the one-shot valve 99. The stem 95 cannot move downwardly to close the valve 94 until the slab of bacon passes beyond the free end of the finger 87 or is manually removed from engagement therewith.

As shown in Fig. 12, the one-shot valve 99 comprises a tubular cylinder 100 closed at one end 101 except for the air inlet 98 which extends therethrough. A longitudinal bore 102 communicates with the air inlet 98 and is counterbored, as indicated at 103, to receive a piston 104 provided with a longitudinal opening 105 extending therethrough. The cylinder 100 is provided with a screw plug 106 closing the open end of the counterbore 103. A compression spring 107, positioned in the counterbore between the piston 104 and the screw plug 106, urges the piston toward the inner end of the counterbore. An air outlet 108 extends through the cylinder wall, and a conduit 109 leads from the outer end of the outlet 108 to the air inlet 79 of the timing valve 66. The inner end of the outlet 108 communicates with the counterbore 103 adjacent the outer end of the cylinder 104 when the cylinder is held against the inner end of the counterbore by the spring 107.

Part of the air entering the one-shot valve 99 strikes against the inner end of the piston 104 and moves it toward the screw plug 106 against the action of the spring 107, and part of it passes through the opening 105 to the outlet 108. The forward end of the piston 104 is adjacent the outlet 108 and therefore closes it as the piston is moved toward the screw plug 106. However, before the piston 104 closes the inner end of the outlet 108, the air that has passed through the opening 105 passes through the outlet 108, the conduit 109, and the air inlet 79 into the lower end of the cylinder 68 where it strikes the disk 73 to move the piston 71 upwardly against the action of the spring 74.

The piston 104 closes the inner end of the outlet 108 approximately at the same time the piston 71 is moved upwardly against the action of the spring 74. The sealing of the inner end of the outlet 108 prevents any further flow of air through the conduit 109 into the lower end of the cylinder 68, and the pressure of the air in the conduit 97 keeps the piston 104 in its sealing position until the finger 87 is lowered to allow the stem 95 to close the valve 94.

The upward movement of the piston 71 seals the air inlet 80 to prevent air from the conduit 65 from entering the upper end of the timing valve 66, and also moves the disk 86 past the exhaust opening 85 of the cylinder 68 so that the lower end of the air cylinder 63, which is connected to the opening 81 by the conduit 110, is open to the atmosphere. Accordingly, as a plurality of the fingers 57 are moved upwardly simultaneously by the slab of bacon immediately after the finger 87 has been moved upwardly, the air in the lower end of the cylinder 63 is at atmospheric pressure and does not resist the downward movement of the piston rod 61.

The set screw 78 is normally adjusted so that the air forced into the lower end of the timing valve 66 from the one-shot valve 99 can bleed slowly from the lower end of valve 66 to the atmosphere through the orifice 77. Immediately after the piston 71 has been forced upwardly against the action of the spring 74, the air pressure below the disk 73 is gradually reduced by bleeding through the orifice 77, and the spring 74 moves the piston 71 down to its normal lowermost position in the cylinder 68. The downward movement of the piston 71 causes the sealing disk 86 to move below the exhaust outlet 85 and also opens the air inlet 80 to restore the normal air pressure in the lower end of the cylinder 63 immediately after the initial displacement of the piston 60 by the simultaneous upward movement of the fingers 57.

It will be apparent, from the foregoing description, that the timing valve 66 temporarily reduces the air pressure in the cylinder 63 in time to allow the fingers 57 to move upwardly freely upon initial engagement by the slab of bacon, and restores the air pressure of the cylinder 63 before the slab of bacon reaches the slicing blade to maintain positive control of the feeding mechanism throughout the bacon slicing operation.

After the slab of bacon passes the lower end of the finger 87, or is removed therefrom, the lower end of the finger 87 moves pivotally downwardly into engagement with the table 15, thus allowing the stem 95 to drop and close the valve 94. The spring 107 then moves the cylinder 104 back to its original position against the inner end of the counterbore 103 of the one-shot valve 99. The air outlet 108 is then again in communication with the counterbore 103, and the one-shot valve 99 is ready to reduce the air pressure in the lower end of the cylinder 63 temporarily whenever the finger 87 is again lifted to raise the stem 95, and thereby open the valve 94.

The meat slicing machine of the present invention includes a third hydraulic system separate from and independent of the hydraulic system just described, and also from the hydraulic system that reciprocates the carriage 13 toward and away from the slicing blade. As shown in Fig. 3, this third hydraulic system comprises essentially a hydraulic pump 111, a servo valve 112 and a hydraulic cylinder 113, each of which is mounted on the panel 33.

The hydraulic pump 111 is provided with a fluid reservoir 114 and is operated continuously, during the operation of the meat slicing machine, by a motor 115. A T-nipple 116 secured in an opening in the pump housing has one branch 117 connected to a conduit 118 and its other branch 119 connected to a pressure relief valve 120. A conduit 121 connects the other end of the pressure relief valve 120 with the reservoir. When one end of the conduit 118 is closed, for reasons hereinafter described, so that fluid cannot flow through it, the pressure builds up sufficiently to open the valve 120, and causes the fluid to flow through the conduit 121 into the reservoir. As long as the end of the conduit 118 remains closed, the fluid which is forced from the reservoir by the pump circulates from the pump through the pressure relief valve and back to the reservoir.

As shown in Fig. 13, the servo valve 112 comprises a tubular cylinder 122 having a longitudinal bore 123 of uniform cross section extending therethrough. An inlet 124 extending through the cylindrical wall has one end of the conduit 118 connected thereto. Two outlets 125 and 126 extending through the cylindrical wall are spaced longitudinally on opposite sides of the inlet 124. A conduit 127 (Fig. 3) leads from the outlet 125 to the lower end of the cylinder 113, and a conduit 128 leads from the outlet 126 to the upper end of the cylinder 113. An exhaust outlet 129 is connected by a conduit 130 to the reservoir 114. The outlet 129 has one branch 131 spaced above the outlet 125 and another branch 132 spaced below the outlet 126.

A spool 133 slidably fitted in the bore 123 is recessed to provide two longitudinally spaced annular recesses 134 and 135 separated by an unrecessed portion 136 of the spool. The lower end 137 of the spool and the portion 138 above the recess 134 are also unrecessed. The unrecessed portions of the spool 133 provide a fluid tight seal with the inner surface of the bore 123 so that fluid in either annular recess cannot leak into the other recess or out of the valve. The spool 133 has a stem 139 of reduced diameter projecting upwardly above the top of the valve. A supporting arm 140 secured to the upper end of the stem 139 has a laterally projecting flange 141 spaced from the upper end of the cylinder 122.

A compression spring 142 encircling the stem 139 bears against the upper surface of the cylinder 122 and the lower surface of the flange 141 to normally hold the spool 133 in position with the unrecessed portion 136 sealing the inlet 124 to prevent entrance of fluid from the conduit 118. In this position, the opening 131 is sealed by the unrecessed portion 138 of the spool, and the opening 132 is sealed by the unrecessed portion 137 of the spool. The longitudinal dimensions of the annular recesses 134 and 135, and the openings 124, 125, 126, 131 and 132, and their spatial relationships, as disclosed in Fig. 13, are such that when the spool 133 is moved downwardly to cause the unrecessed portion 136 to move out of sealing engagement with the inlet 124, both openings 124 and 125 communicate with the annular recess 134, and both openings 126 and 132 communicate with the annular recess 135. The opening 131 remains sealed by the unrecessed portion 138 of the spool 133. When the spool 133 is moved upwardly to cause the unrecessed portion 136 to move out of sealing engagement with the inlet 124, both openings 124 and 126 communicate with the annular recess 135, and both openings 125 and 131 communicate with the annular recess 134. The opening 132 is closed by the lower end 137 of the spool.

The supporting arm 140 is pivotally secured to the intermediate portion of a floating lever 143, as indicated at 144 in Fig. 3. As indicated at 145 and 146, respectively, the floating lever is pivotally connected at one end to the piston rod 61 and at its other end to a piston rod 147 projecting upwardly from a piston 148 (Fig. 14) slidably mounted in the cylinder 113. Since the flow of fluid in the cylinder 113 is controlled by the servo valve 112, the piston 148 is stationary as long as the spool 133 is in the position shown in Fig. 13, in which the unrecessed portion 136 of the spool 133 seals the inlet 124 of the servo valve.

When the piston 148 is stationary, the floating lever 143 is fulcrumed at 146. Downward movement of the piston rod 61 moves the lever pivotally downward about the pivot 146, thereby moving the spool 133 downwardly in the bore 123 of the servo valve. This downward movement of the spool 133 uncovers the inlet 124 and causes the fluid from the conduit 118 to flow into the lower end of the cylinder 113 to move the piston 148 and its piston rod 147 upwardly. When the displacement of fluid in the large cylinder 44 stops, the piston rod 61 becomes stationary, and the fulcrum of the floating lever shifts to the connection 145. Continued upward movement of the piston rod 147 moves the floating lever upwardly about the pivot 145, and thereby lifts the spool 133 to close the opening 124 and restore the equilibrium of the servo valve. Accordingly, the movement of the piston rod 147, stops immediately after the movement of the piston rod 61 stops.

The flow control valve 29 is rotatable in one direction to increase the flow of fluid therethrough and in the opposite direction to decrease the flow. A split clamp 149 is secured to the flow control valve by a screw 150, as shown in Fig. 3. The clamp has a slotted arm 151 extending from one side thereof. A link 152 adjustably secured to the slotted arm by a screw 153 is secured at its other end to the piston rod 147. The link 152 comprises two sections threaded into opposite sides of a nut 154 to permit longitudinal adjustment of the effective length of the piston rod 147. The longitudinal adjustment of the piston rod 147 fixes the range of movement for the flow control valve.

The operation of the means for regulating the speed of the carriage which feeds the bacon to the slicing blade may be summarized as follows: As the carriage moves a slab of bacon toward the slicing blade, the front edge of the slab of bacon strikes the initiating finger 87 which actuates the one-shot valve 99 to shoot a blast of air into the lower end of the timing valve 66. This blast of air moves the piston 71 to close the opening 80, through which the conduit 65 normally supplies air to the valve 66 and through the conduit 110 to the lower end of the cylinder 63, and to establish communication of the lower end of the cylinder 63 with the atmosphere. The slab of bacon then lifts the lower ends of each of the fingers 57 engaged by it before the air pressure of the cylinder 63 is restored. There is substantially no resistance to the downward movement of the piston rod 61, and it moves freely in response to the displacement of fluid from the cylinders 37 and 38 by the upward movement of the finger pistons 46 and 47. The piston rod 61 moves the floating lever 143 downwardly about its initial pivot 146 to open the servo valve 112 and move the piston 148 upwardly to rotate the flow control valve 29 towards closing position to slow down the movement of the carriage 13.

Immediately after the initial displacement of fluid by the pistons 46 and 47 the air from the lower end of the valve 66 bleeds to the atmosphere through the orifice 77. The piston 71 is moved to its normal position by the spring 74 and the air pressure is restored in the lower end of the cylinder 63. Thereafter movement of the fingers 57 in either direction, depending upon the variations in the cross sectional area of the slab of bacon in engagement therewith will move the piston rod 61 downwardly, or permit the air pressure of the cylinder 63 to move it upwardly, so that the lever 143 is moved pivotally in either direction, thus moving the spool 133 of the servo valve 112 to allow the flow of fluid to either the lower or upper end of the cylinder 113. The movement of the piston 148 in the cylinder 113 causes the piston rod 147 to turn the flow control valve to speed up the feed if the cross sectional area of the slab of bacon decreases, and to slow the feed if the cross sectional area increases.

While I have described a preferred embodiment of my invention in considerable detail, it will be understood that the description thereof is intended to be illustrative, rather than restrictive, as many details of the structure may be modified or changed without departing from the spirit or scope of the invention. Accordingly, I do not desire to be restricted to the exact construction described.

I claim:

1. In a meat slicing machine, a slicing blade, means movably mounted on said machine for feeding a slab of meat to said slicing blade, a flow control valve for regulating the speed of said feeding means, a piston rod, means operatively connected to said piston rod and engageable with the top surface of a slab of meat at a plurality of transversely spaced points extending across the entire width of said slab of meat, said second mentioned means being movable to a different extent in parallel vertical planes at each of said points of engagement by variations in the thickness of a slab of meat being fed to said slicing blade, the total composite movement of said second mentioned means being effective to move said piston rod, a floating lever connected to said piston rod, and means connected to said floating lever and operatively connected to said flow control valve, said last mentioned means being actuated by said floating lever to move said flow control valve in response to movement of said piston rod.

2. In a meat slicing machine, a slicing blade, means movably mounted on said machine for feeding a slab of meat to said slicing blade, a flow control valve for regulating the speed of said feeding means, a hydraulic cylinder, a piston and piston rod mounted in said cylinder, said piston rod being operatively connected to said flow control valve, a hydraulic pump, a valve connected to said pump and said cylinder for directing the flow of fluid from said pump into said cylinder, and means engageable with a slab of meat being fed to said slicing blade and operatively connected to said last mentioned valve, said last mentioned means being movable by variations in the thickness of said slab of meat at a plurality of transversely spaced points adjacent the slicing blade to actuate said last mentioned valve.

3. In a meat slicing machine, a slicing blade, means movably mounted on said machine for feeding a slab of meat to said slicing blade, a flow control valve for regulating the speed of said feeding means, a hydraulic cylinder, a piston and piston rod mounted in said cylinder, said piston rod being operatively connected to said flow control valve, a hydraulic pump, a valve connected to said pump and said cylinder for directing the flow of fluid from said pump into said cylinder, and means responsive to variations in the cross sectional area of said slab of meat adjacent the slicing blade to actuate said last mentioned valve, said last mentioned means comprising a plurality of fingers pivotally mounted to engage the upper surface of said slab of meat, and a piston controlled by the total pivotal movement of said fingers.

4. In a meat slicing machine, a slicing blade, means movably mounted on said machine for feeding a slab of meat to said slicing blade, a flow control valve for regulating the speed of said feeding means, a hydraulic cylinder, a piston and piston rod mounted in said cyilnder, said piston rod being operatively connected to said flow control valve, a hydraulic pump, a valve connected to said pump and said cylinder for directing the flow of fluid from said pump into said cylinder, and means responsive to variations in the cross sectional area of said slab of meat adjacent the slicing blade to actuate said last mentioned valve, said last mentioned means comprising a plurality of fingers pivotally mounted to engage the upper surface of said slab of meat, a piston and piston rod controlled by the total pivotal movement of said fingers, and a lever connected to said last mentioned piston rod and said last mentioned valve.

5. In a meat slicing machine, a slicing blade, means movably mounted on said machine for feeding a slab of meat to said slicing blade, a flow control valve for regulating the speed of said feeding means, a piston rod operatively connected to said flow control valve for moving it in either direction, a second piston rod, means operatively connected to said second piston rod, said second mentioned means being movable by variations in the thickness of a slab of meat being fed to said slicing blade taken along a transverse vertical plane through said slab, the total cumulative displacement of said second mentioned means in said vertical plane being effective to move said second piston rod, a floating lever interconnecting said piston rods, and means actuated by said floating lever to move said first mentioned piston rod in response to movement of said second piston rod.

6. In a meat slicing machine, a slicing blade, means movably mounted on said machine for feeding a slab of meat to said slicing blade, a flow control valve for regulating the speed of said feeding means, a hydraulic cylinder, a piston rod mounted in said cylinder and operatively connected to said flow control valve for moving it in either direction, a second valve for directing the flow of fluid in said cylinder, a second piston rod operable to actuate said second valve for directing the flow of fluid in said first cylinder, and means to move said second piston rod, said last mentioned means comprising a plurality of interconnected hydraulic cylinders, a piston slidably mounted in each of said interconnected hydraulic cylinders, and a plurality of fingers engaging said pistons and engageable by a slab of meat being fed to said slicing blade, each of said fingers being movable to move one of said pistons in response to variations in the thickness of said slab of meat.

7. In a meat slicing machine, a slicing blade, means movably mounted on said machine for feeding a slab of meat to said slicing blade, a valve for regulating the speed of said feeding means, a hydraulic cylinder, piston and piston rod, said piston rod being operatively connected to said valve, a hydraulic pump for moving said piston in said cylinder, and means including a plurality of fingers pivotally mounted on said machine and pivotally movable in response to variations in the transverse cross sectional area of the slab of meat being sliced, a plurality of interconnected individual cylinders, a piston reciprocably mounted in each of said cylinders, each of said last mentioned pistons being engageable with one of said fingers so as to be moved by its pivotal movement to displace fluid from said interconnected cylinders, and another piston operable by the cumulative fluid displacement from said interconnected cylinders, said last mentioned means being operable to direct the flow of fluid from said pump into said first mentioned cylinder.

8. In a meat slicing machine, a slicing blade, means movably mounted on said machine for feeding a slab of meat to said slicing blade, a flow control valve for regulating the speed of said feeding means, a plurality of fingers engageable with the top surface of said slab of meat and movable individually in response to variations in the thickness of said slab, an air cylinder normally adapted to resist movement of said fingers in one direction, means pivotally mounted on said machine forwardly of said fingers and engageable by said slab of meat prior to its engagement with said fingers to temporarily release air pressure from said air cylinder and thereby facilitate the initial movement of said fingers in said one direction, and means operatively connecting said fingers to said flow control valve to move it in either direction.

9. In a meat slicing machine, a slicing blade, means movably mounted on said machine for feeding a slab of meat to said slicing blade, a flow control valve for regulating the speed of said feeding means, a plurality of fingers engageable with the top surface of said slab of meat and movable individually in response to variations in the thickness of said slab, a piston rod movable proportionally to the total movement of said fingers, an air cylinder normally adapted to resist the movement of said piston rod in one direction, a separate finger pivotally mounted on said machine forwardly of said plurality of fingers, said separate finger being engageable by said slab of meat prior to its engagement with said plurality of fingers to temporarily release air pressure from said air cylinder and thereby facilitate the initial movement of said piston rod in said one direction, a second piston rod operatively connected to said flow control valve to move it in either direction, and means interconnecting said piston rods to move said second piston rod proportionally to the movement of said first mentioned piston rod.

10. In a meat slicing machine, a slicing blade, means movably mounted on said machine for feeding a slab of meat to said slicing blade, a flow control valve for regulating the speed of said feeding means, a plurality of fingers engageable with the top surface of said slab of meat and movable individually in response to variations in the thickness of said slab, a piston rod movable proportionally to the total movement of said fingers, an air cylinder normally adapted to resist the movement of said piston rod in one direction, means pivotally mounted on said machine forwardly of said fingers and engageable by said slab of meat prior to its engagement with said fingers to temporarily release air pressure from said air cylinder and thereby facilitate the initial movement of said piston rod in said one direction, a second piston rod operatively connected to said flow control valve to move it in either direction, a floating lever secured to each of said piston rods, a valve operatively connected to said floating lever and movable thereby to cause said second mentioned piston rod to move in response to movement of said first mentioned piston rod.

11. In a meat slicing machine, a slicing blade, means movably mounted on said machine for feeding a slab of meat to said slicing blade, control means for regulating the speed of said feeding means, a hydraulic cylinder, piston and piston rod, said piston rod being operatively connected to said control means, a hydraulic pump for moving said piston in said cylinder, a valve for controlling the direction of flow of fluid from said pump to said cylinder, and means including a plurality of fingers pivotally mounted on said machine and responsive to variations in the cross sectional area of the slab of meat being sliced for actuating said valve.

12. In a meat slicing machine, a slicing blade, means movably mounted on said machine for feeding a slab of meat to said slicing blade, control means for regulating the speed of said feeding means, a hydraulic cylinder, piston and piston rod, said piston rod being operatively connected to said control means, a hydraulic pump for moving said piston in said cylinder, a valve for controlling the direction of flow of fluid from said pump to said cylinder, and means movable by variations in the thickness of the slab of meat being fed to said slicing blade taken along a transverse vertical plane through said slab, the total cumulative displacement of said last mentioned means being effective to actuate said valve, said last mentioned means including a floating lever operatively connected to said valve.

13. In a meat slicing machine, a slicing blade, means movably mounted on said machine for feeding a slab of meat to said slicing blade, a flow control valve for regulating the speed of said feeding means, hydraulic means for moving said flow control valve, said hydraulic means comprising a cylinder, piston and piston rod, said piston rod being operatively connected to said flow control valve, a hydraulic pump for moving said piston in said cylinder, a valve for controlling the direction of flow of fluid from said pump to said cylinder, and a lever for actuating said last mentioned valve, a second cylinder having a piston and a piston rod connected to said lever, a plurality of cylinders and a piston in each of said last mentioned cylinders, a finger engaging each of said last mentioned pistons, each of said fingers being movable by said slab of meat to move said last mentioned pistons in response to variations in the thickness of said slab of meat, said last mentioned cylinders communicating with said second cylinder, whereby displacement of fluid by said last mentioned pistons moves the piston in said second cylinder.

14. In a meat slicing machine, a slicing blade, means movably mounted on said machine for feeding a slab of meat to said slicing blade, control means for regulating the speed of said feeding means, a hydraulic cylinder, piston and piston rod, said piston rod being operatively connected to said control means, a hydraulic pump for moving said piston in said cylinder, a valve for controlling the direction of flow of fluid from said pump to said cylinder, and means responsive to variations in the cross sectional area of the slab of meat being sliced for actuating said valve, said last mentioned means comprising a floating lever operatively connected to said valve, a plurality of cylinders, a piston in each of said cylinders, and a plurality of fingers engaging the free end of each of said last mentioned pistons, each of said fingers being movable by said slab of meat in proportion to the variations in the thickness of said slab of meat, said last mentioned pistons cooperating to move said floating lever in accordance with their total displacement.

15. In a meat slicing machine, a slicing blade, means movably mounted on said machine for feeding a slab of meat to said slicing blade, a flow control valve for regulating the speed of said feeding means, a hydraulic system including a cylinder, piston and piston rod, means including a plurality of fingers pivotally mounted on said machine and engageable with the top of a slab of meat being fed to said slicing blade for moving said piston in accordance with variations in the transverse cross sectional area of the slab of meat adjacent the slicing blade, a second hydraulic system including a hydraulic pump, a servo valve, a second cylinder, piston and piston rod, said pump being operable through said servo valve to move said second mentioned piston, said second mentioned piston rod being operatively connected to said flow control valve, and a floating lever secured to said first mentioned piston rod and said servo valve, whereby movement of said first mentioned piston rod moves said floating lever to actuate said servo valve and thereby control the flow of fluid from said pump to said second cylinder.

16. In a meat slicing machine, a slicing blade, means movably mounted on said machine for feeding a slab of meat to said slicing blade, and three independent hydraulic systems for regulating the speed of said feeding means, the first hydraulic system including a flow control valve, the second hydraulic system including a cylinder, piston and piston rod, and means for moving said piston rod in accordance with variations in the transverse cross sectional area of the slab of meat adjacent the slicing blade, the third hydraulic system including a hydraulic pump, a servo valve, a second cylinder, piston and piston rod, said pump being operable through said servo valve to move said second mentioned piston, means on said second mentioned piston rod engageable with said flow control valve to move said flow control valve in response to movement of said second piston, and a floating lever connected to said servo valve, said floating lever being secured at one end to said first mentioned piston rod, whereby movement of said first mentioned piston rod moves said floating lever to set the servo valve and thereby control the flow of fluid from said pump to said second cylinder.

17. In a meat slicing machine, a slicing blade, means movably mounted on said machine for feeding a slab of meat to said slicing blade, control means for regulating the speed of said feeding means, a hydraulic system including a piston rod, means operatively connected to said piston rod for moving it in accordance with variations in the transverse cross sectional area of the slab of meat adjacent the slicing blade, a second hydraulic system including a hydraulic pump, a cylinder, piston and piston rod, said pump being operable to move said piston in said cylinder, means on said last mentioned piston rod engageable with said control means and operable to move said control means in response to movement of said piston, a lever secured to said first mentioned piston rod and movable thereby, and a valve operable by said lever to control the flow of fluid from said pump to said cylinder.

18. In a meat slicing machine, a slicing blade, means movably mounted on said machine for feeding a slab of meat to said slicing blade, control means for regulating the speed of said feeding means, a hydraulic system comprising a piston rod and a plurality of fingers engageable with a slab of meat being fed to said slicing blade, said fingers being operable in response to variations in the transverse cross sectional area of said slab of meat to move said piston rod, a second hydraulic system comprising a hydraulic pump, a valve, a cylinder and piston rod, a clamp mounted on said last mentioned piston rod, said clamp engaging said control means to move it in response to movement of said last mentioned piston rod, and a lever secured to said first mentioned piston rod and said valve to control the flow of fluid from said hydraulic pump into said cylinder.

19. In a meat slicing machine, a slicing blade, means movably mounted on said machine for feeding a slab of meat to said slicing blade, control means for regulating the speed of said feeding means, a hydraulic system comprising a cylinder, piston and piston rod, means operatively connected to said piston and engageable with said slab of meat, said means being operable in response to variations in the transverse cross sectional area of said slab of meat to move said piston in said cylinder, a second hydraulic system comprising a hydraulic pump, a cylinder, a piston and piston rod, means operatively connected to said last mentioned piston rod and said control means to move said control means in response to movement of said last mentioned piston, and a valve operable by said first mentioned piston rod to control the flow of fluid from said hydraulic pump into said last mentioned cylinder.

20. In a meat slicing machine, a slicing blade, means movably mounted on said machine for feeding a slab of meat to said slicing blade, a flow control valve for regulating the speed of said feeding means, a hydraulic system comprising a cylinder, piston and piston rod, means operatively connected with said piston rod and engageable with said slab of meat, said means being operable in response to variations in the transverse cross sectional area of said slab of meat to move said piston in said cylinder, a second hydraulic system comprising a hydraulic pump, a cylinder, a piston and piston rod, a clamp mounted on said last mentioned piston rod, said clamp engaging said flow control valve to move it in response to movement of said last mentioned piston, and a floating lever operable by said first mentioned piston rod to control the flow of fluid from said hydraulic pump into said last mentioned cylinder.

21. In a meat slicing machine, a slicing blade, means movably mounted on said machine for feeding a slab of meat to said slicing blade, control means for regulating the speed of said feeding means, a hydraulic system comprising a plurality of cylinders and a plurality of pistons, a plurality of fingers pivotally mounted on said machine and engageable by a slab of meat being fed to said slicing blade, each of said fingers being operatively connected to one of said pistons to move said pistons in response to variations in thickness of said slab of meat adjacent said slicing blade, a piston rod movable in accordance with the total displacement of said pistons, a second hydraulic system comprising a hydraulic pump, a valve, a cylinder, a piston and piston rod, said last mentioned piston rod being operatively connected to said control means, and a floating lever connected to said valve, said floating lever being secured to the first mentioned piston rod and movable thereby to actuate said valve to control the flow of fluid from said hydraulic pump into said last mentioned cylinder.

22. In a meat slicing machine, a slicing blade, means movably mounted on said machine for feeding a slab of meat to said slicing blade, control means for regulating the speed of said feeding means, a plurality of fingers engageable by said slab of meat to actuate said control means, means normally adapted to resist movement of said fingers, a plurality of valves adapted to cooperate to render said last mentioned means inoperative temporarily to facilitate simultaneous movement of said fingers upon initial engagement of said fingers by said slab of meat, and a separate finger pivotally mounted on said machine forwardly of said plurality of fingers, said separate finger being engageable by said slab of meat prior to engagement of said plurality of fingers by said slab of meat to actuate said valves.

23. In a meat slicing machine, a slicing blade, means movably mounted on said machine for feeding a slab of meat to said slicing blade, control means for regulating the speed of feeding means, a plurality of fingers engageable by said slab of meat to actuate said control means, an air cylinder normally adapted to retain air under pressure to resist movement of said fingers, a plurality of valves adapted to cooperate to release air pressure from said cylinder temporarily to facilitate simultaneous movement of said fingers upon initial engagement of said fingers by said slab of meat, and to restore said air pressure immediately thereafter, and a separate finger pivotally mounted on said machine forwardly of said plurality of fingers, said separate finger being engageable by said slab of meat prior to engagement of said plurality of fingers by said slab of meat to actuate said valves.

24. In a meat slicing machine, a slicing blade, means movably mounted on said machine for feeding a slab of meat to said slicing blade, a flow control valve for regulating the speed of said feeding means, a hydraulic system comprising a plurality of interconnected cylinders, a piston and piston rod in each of said cylinders, a plurality of fingers pivotally mounted on said machine and engageable with a slab of meat being fed to said slicing blade for moving said pistons and piston rods in response to variations in the transverse crosssectional area of said slab of meat, an air cylinder normally adapted to resist the movement of said pistons and piston rods, a separate finger pivotally mounted on said machine forwardly of said plurality of fingers, said last mentioned finger being engageable by said slab of meat prior to movement of said pistons and piston rods, said last mentioned finger being operable upon engagement by said slab of meat to release air pressure from said air cylinder temporarily to facilitate initial movement of said pistons and piston rods, a second hydraulic system comprising a hydraulic pump, a cylinder and piston, means to move said flow control valve in response to movement of said last mentioned piston, and means operable by said first mentioned piston rods to control the flow of fluid from said hydraulic pump into said last mentioned cylinder.

25. In a meat slicing machine, a slicing blade, means movably mounted on said machine for feeding a slab of meat to said slicing blade, control means for regulating the speed of said feeding means, a hydraulic system comprising a piston rod, means operatively connected to said piston rod through said hydraulic system and engageable with the top surface of a slab of meat being fed to said slicing blade to move said piston rod in response to variations in the transverse cross sectional area of said slab of meat adjacent the slicing blade, an air cylinder containing a reservoir of air in one end, said piston rod being seated in said air cylinder on one side of said air, said air being normally adapted to resist the movement of the piston rod, means interconnected to the end of said air cylinder in which said air is held and operable to relieve the pressure of said air and thereby render said air cylinder temporarily inoperative to facilitate initial movement of said piston rod, a second hydraulic system comprising a hydraulic pump, a valve, a cylinder, piston and piston rod, a clamp mounted on said last mentioned piston rod, said clamp engaging said control means to move it in response to movement of said last mentioned piston, and a lever secured to the first mentioned piston rod to actuate said valve and thereby control the flow of fluid from said hydraulic pump into said last mentioned cylinder in accordance with movement of said first mentioned piston rod.

26. In a meat slicing machine, a slicing blade, means movably mounted on said machine for feeding a slab of meat to said slicing blade, a flow control valve for regulating the speed of said feeding means, a hydraulic system comprising a cylinder, a piston and piston rod movable in said cylinder in response to variations in the transverse cross sectional area of said slab of meat adjacent the slicing blade, an air cylinder normally adapted to resist the movement of the piston, means to release air pressure from said air cylinder temporarily to facilitate initial movement of said piston, a second hydraulic system comprising a hydraulic pump, a cylinder, piston and piston rod, means operatively connected to said last mentioned piston rod and said flow control valve to move said flow control valve in response to movement of said last mentioned piston, and means interconnected to both of said piston rods, said last mentioned means being operable by the first mentioned piston rod to control the flow of fluid from said hydraulic pump into said last mentioned cylinder.

27. In a meat slicing machine, a slicing blade, means movably mounted on said machine for feeding a slab of meat to said slicing blade, a flow control valve for regulating the speed of said feeding means, a hydraulic system comprising a cylinder, a piston movable in said cylinder in response to variations in the transverse cross sectional area of said slab of meat adjacent the slicing blade, and a piston rod extending from said piston, an air cylinder into which said piston rod extends, said air cylinder being normally adapted to resist the movement of the piston, means for temporarily releasing air pressure from said air cylinder to facilitate initial movement of said piston, a second hydraulic system comprising a hydraulic pump, a cylinder, piston and piston rod, means operatively connected to said last mentioned piston rod and said flow control valve to move said flow control valve in response to movement of said last mentioned piston, a valve for directing the flow of fluid from said hydraulic pump into said last mentioned cylinder, and means interconnected to both of said pistons and said last mentioned valve, said last mentioned means being operable by said first mentioned piston rod to actuate said last mentioned valve.

28. In a meat slicing machine, a slicing blade, means movably mounted on said machine for feeding a slab of meat to said slicing blade, a flow control valve for regulating the speed of said feeding means, a hydraulic system comprising a cylinder, a piston movable in said cylinder, a plurality of fingers pivotally mounted on said machine, said fingers being engageable with the top surface of a slab of meat being fed to said slicing blade and operatively connected through said hydraulic system to said piston to move said piston in response to variations in the transverse cross sectional area of said slab of meat, a piston rod extending from said piston, an air cylinder into which said piston rod extends, said air cylinder being normally adapted to resist the movement of the piston, a one-shot valve connected to said air cylinder, a separate finger pivotally mounted on said machine forwardly of said plurality of fingers and engageable by said slab of meat prior to movement of said piston, said separate finger being operable upon engagement by said slab of meat to actuate said one-shot valve to release air pressure from said air cylinder temporarily to facilitate initial movement of said piston, a timing valve adapted to restore said air pressure before said slab of meat engages said slicing blade, a second hydraulic system comprising a hydraulic pump, a servo valve, a cylinder, piston and piston rod, a clamp mounted on said last mentioned piston rod, said clamp engaging said flow control valve to move it in response to movement of said last mentioned piston, and a floating lever secured to the first mentioned piston rod to actuate said servo valve and thereby control the flow of fluid from said hydraulic pump through said servo valve and into said last mentioned cylinder.

References Cited in the file of this patent

UNITED STATES PATENTS

| | | |
|---|---|---|
| 2,189,475 | Saur | Feb. 6, 1940 |
| 2,719,517 | Adler | Oct. 4, 1955 |
| 2,768,666 | Garapolo et al. | Oct. 30, 1956 |
| 2,802,456 | Lance | Aug. 13, 1957 |

OTHER REFERENCES

"Bacon Giveaway on Way Out With Use of New Electronic Setup" from the National Provisioner of Oct. 20, 1956, pages 32 to 35.